United States Patent
Kim et al.

(10) Patent No.: US 9,965,353 B2
(45) Date of Patent: May 8, 2018

(54) DISTRIBUTED FILE SYSTEM BASED ON TORUS NETWORK

(71) Applicant: ELECTRONICS AND TELECOMMUNICATIONS RESEARCH INSTITUTE, Daejeon (KR)

(72) Inventors: Chei Yol Kim, Daejeon (KR); Dong Oh Kim, Daejeon (KR); Young Kyun Kim, Daejeon (KR); Hong Yeon Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 57 days.

(21) Appl. No.: 15/164,449

(22) Filed: May 25, 2016

(65) Prior Publication Data

US 2017/0212802 A1    Jul. 27, 2017

(30) Foreign Application Priority Data

Jan. 26, 2016 (KR) .................. 10-2016-0009435

(51) Int. Cl.

| G11C 29/00 | (2006.01) |
|---|---|
| G06F 11/10 | (2006.01) |
| G06F 3/06 | (2006.01) |
| G06F 17/30 | (2006.01) |

(52) U.S. Cl.
CPC .......... *G06F 11/1076* (2013.01); *G06F 3/064* (2013.01); *G06F 3/067* (2013.01); *G06F 3/0619* (2013.01); *G06F 17/30194* (2013.01)

(58) Field of Classification Search
None
See application file for complete search history.

(56) References Cited

U.S. PATENT DOCUMENTS

| 6,253,292 | B1* | 6/2001 | Jhang ................. G06F 12/0813 709/218 |
|---|---|---|---|
| 6,718,428 | B2 | 4/2004 | Lee et al. |
| 8,997,109 | B2 | 3/2015 | Lee et al. |
| 9,432,298 | B1* | 8/2016 | Smith ................. H04L 49/9057 |
| 2003/0191855 | A1* | 10/2003 | Lee .................... G06F 15/17337 709/239 |
| 2005/0053057 | A1* | 3/2005 | Deneroff ........... G06F 15/17381 370/360 |
| 2008/0313506 | A1* | 12/2008 | Archer ................ G06F 11/2236 714/48 |
| 2012/0092987 | A1* | 4/2012 | Chung .................... H04L 45/60 370/229 |
| 2014/0226479 | A1 | 8/2014 | Fricker |
| 2015/0207880 | A1 | 7/2015 | Jin et al. |
| 2016/0301754 | A1* | 10/2016 | Lee ..................... H04L 67/1097 |

* cited by examiner

*Primary Examiner* — Daniel McMahon

(57) ABSTRACT

A distributed file system, based on a torus network, includes a center node and one or more storage nodes. The center node encodes data when the data is received from a client. The one or more storage nodes receive data blocks or parity blocks from the center node and store the data blocks or parity blocks.

20 Claims, 5 Drawing Sheets

--Prior Art--

DISTRIBUTED FILE SYSTEM BASED ON TORUS NETWORK

CROSS-REFERENCE TO RELATED APPLICATION

This application claims priority to and the benefit of Korean Patent Application No. 10-2016-0009435, filed on Jan. 26, 2016, the disclosure of which is incorporated herein by reference in its entirety.

BACKGROUND

1. Field of the Invention

The present invention relates to a distributed file system and a method of supporting data fault tolerance in the same.

2. Discussion of Related Art

Recently, with the prevalence of smart phones, tablet personal computers (PCs), wearable devices, etc., unstructured high-quality data is continuously increasing, and an increase in the capacity of a cloud storage is becoming problematic. Also, a large amount of data generated from Internet of things (IoT) communication in which things are interconnected and virtualized is stored in a cloud storage, and thus there is an urgent need to develop a cost-effective high-capacity cloud storage technology.

Meanwhile, with the development of an exabyte-level cloud storage, various cost-reduction technologies are being demanded. In particular, efficiency of storage space utilization is considered important for reducing cost in relation to data fault tolerance, and thus technologies related to erasure coding are attracting a great deal of attention. Also, to reduce network construction cost, torus interconnection network technologies employing direct inter-node communications, etc. are on the rise.

Here, the storage erasure coding is a technology for generating parity blocks in data units of a specific size and storing data blocks and the parity blocks in a plurality of nodes in units of a specific size in a distributed manner. In other words, according to storage erasure coding, even when a part of data is lost, it is possible to recover the data through decoding.

A distributed file system generally uses a fat-tree interconnection network in which network loads between servers are the same. However, a fat-tree interconnection network requires a large number of expensive switches for hundreds of or more connections, and thus has limitations in terms of node expandability. Such a problem of expandability of the interconnection network can be solved by a storage network configuration based on a torus interconnection network.

However, when data fault tolerance is supported through the erasure coding in a distributed file system based on a torus interconnection network, transmission loads between nodes vary, unlike those in a fat-tree interconnection network. Also, there may be a case in which it is necessary to pass through an intermediate node for communication between nodes.

Therefore, a distributed file system based on a torus interconnection network currently requires a technology for effectively using erasure coding.

In this regard, Korean Patent Publication No. 10-2013-0093736 (title: Routing system and method using torus topology in on-chip network) discloses a routing system and method for minimizing the size of an additional buffer (virtual channel) through deadlock recovery with tokens (DRT) while still using abundant wires provided by a two-dimensional (2D) torus topology.

SUMMARY OF THE INVENTION

The present invention is directed to providing a distributed file system based on a torus interconnection network capable of effectively supporting erasure coding to construct an exabyte-level storage and a method of supporting data fault tolerance in the distributed file system.

Objectives of the present invention are not limited to the technological objective mentioned above, and other objectives may be apparent to those of ordinary skill in the art from the description below.

According to an aspect of the present invention, there is provided a distributed file system based on a torus interconnection network, the distributed file system including: a center node configured to encode data when the data is received from a client; and one or more storage nodes configured to receive data blocks or parity blocks generated by the encoding from the center node and store the data blocks or parity blocks.

According to another aspect of the present invention, there is provided a method of supporting data fault tolerance in a distributed file system, the method including: determining a center node which will encode data among a plurality of nodes included in a torus network; and determining storage nodes in which data blocks and parity blocks generated by the encoding will be stored in a distributed manner based on the center node. Here, when data is received from a client, the center node encodes received data and stores the data blocks and the parity blocks generated by the encoding in the storage nodes in the distributed manner.

BRIEF DESCRIPTION OF THE DRAWINGS

The above and other objectives, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention. To clearly describe the present invention, parts irrelevant to the description have been omitted from the drawings.

The term "include" used herein does not preclude the presence or addition of one or more components, steps, operations, and/or elements other than the stated components, steps, operations, and/or elements.

In a fat-tree interconnection network according to related art, any node can distribute or collect data without a particular problem because when the numbers of network hops between nodes are the same, data transmission loads between nodes are the same.

However, in a torus interconnection network, the number of network hops varies according to locations of nodes. Unless two nodes are adjacent to each other, data is transferred through other nodes between the two nodes, and thus the delay of data transmission may vary according to the states of the nodes through which the data transfer occurs. Therefore, when an erasure coding technique is applied to a distributed file system based on a torus interconnection network, it is important to determine nodes in which data will be stored in a distributed manner and determine roles of the selected nodes.

Here, the erasure coding technique is a technique for generating n encoding blocks by encoding data of specific-size units, storing the n encoding blocks in the distributed manner, and thereby ensuring data fault tolerance.

According to the erasure coding technique, codes are classified into systematic codes whose encoded output includes as-is input data and non-systematic codes whose encoded output does not include input data but only includes encoded data. A systematic code which normally does not require decoding is applied to an exemplary embodiment of the present invention.

In the case of a systematic code, one encoded stripe consists of n blocks. Here, the n blocks are the sum of k data blocks including original data and m parity blocks.

The n encoded blocks generated through the erasure coding technique are stored in different nodes in the distributed manner, and thus the data can be recovered even when a fault occurs in a data server or a disk.

In other words, when the divided k data blocks are not lost, it is possible to read the original data by loading and then combining the k data blocks. Also, when m or fewer blocks among the k data blocks are lost, decoding is performed using the remaining data blocks and the parity blocks so that the original data blocks can be recovered.

Figure 1:
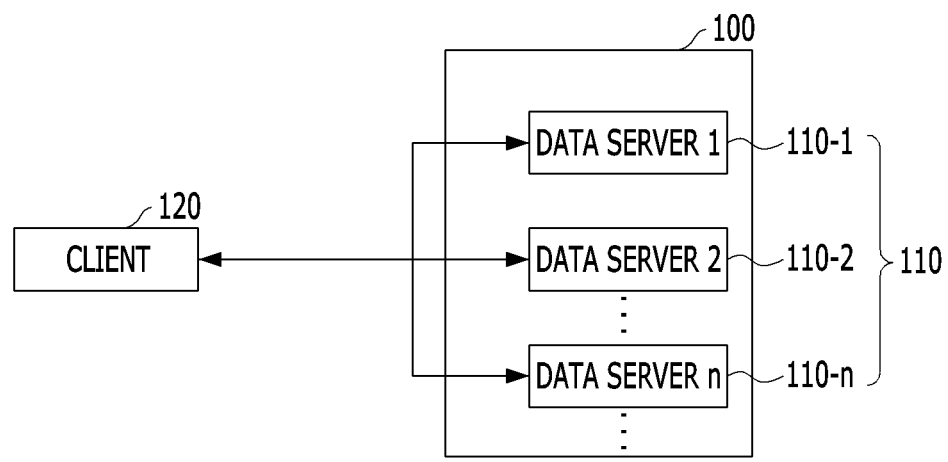
FIG. 1 is a block diagram of a distributed file system in which a client performs encoding.

Meanwhile, there is a data encoding method in which a client performs encoding as shown in FIG. 1.

FIG. 1 is a block diagram of a distributed file system 100 in which a client performs encoding.

When a client 120 performs encoding and stores encoded blocks in a plurality of data servers 110-1, 110-2, . . . , and 110-*n* in the distributed manner, the client performs the encoding by itself. Also, the client 120 transmits the encoded blocks to each of the plurality of data servers 110-1, 110-2, . . . , and 110-*n*.

Also, since the distributed file system 100 shown in FIG. 1 stores data in the remote data servers 110 through a network, input and output delays of the distributed file system 100 become longer than those of a local file system. In addition, the distributed file system 100 has a drawback in that it has additional delays for encoding and distributed data transmission.

Therefore, in a distributed file system, it is preferable to perform data encoding at a specific data server rather than by a client. A distributed file system based on a torus network according to an exemplary embodiment of the present invention in which a specific data server (referred to as a "center node") receives and encodes entire original data and stores the encoded data in other data servers (referred to as "storage nodes") in the distributed manner will be described below with reference to FIGS. 2 to 5.

Figure 2:
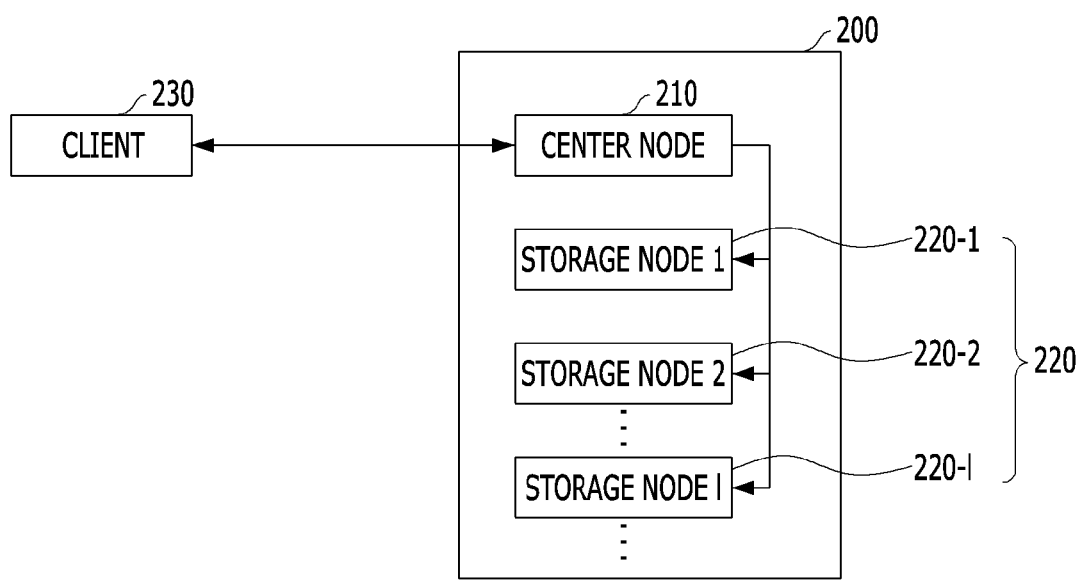
FIG. 2 is a block diagram of a distributed file system according to an exemplary embodiment of the present invention.

FIG. 2 is a block diagram of a distributed file system 200 according to an exemplary embodiment of the present invention.

The distributed file system 200 according to an exemplary embodiment of the present invention includes a center node 210 and one or more storage nodes 220.

When data is received from a client 230, the center node 210 encodes the data.

The one or more storage nodes 220 receive data blocks or parity blocks generated through encoding from the center node 210 and store the received blocks. Here, the center node 210 may perform the functions of the storage nodes 220.

Figure 3A:
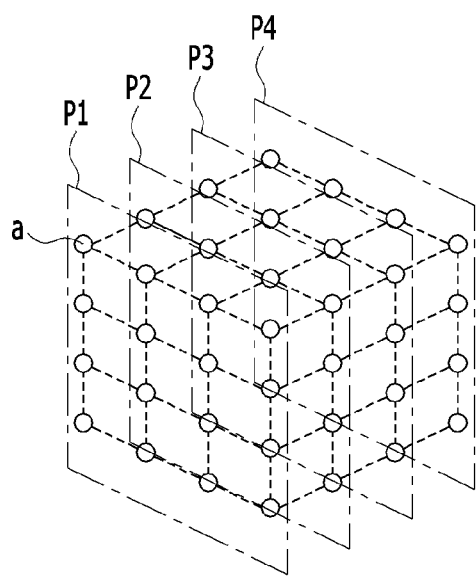
FIG. 3A and FIG. 3B shows examples of a torus network according to an exemplary embodiment of the present invention.
Figure 3B:
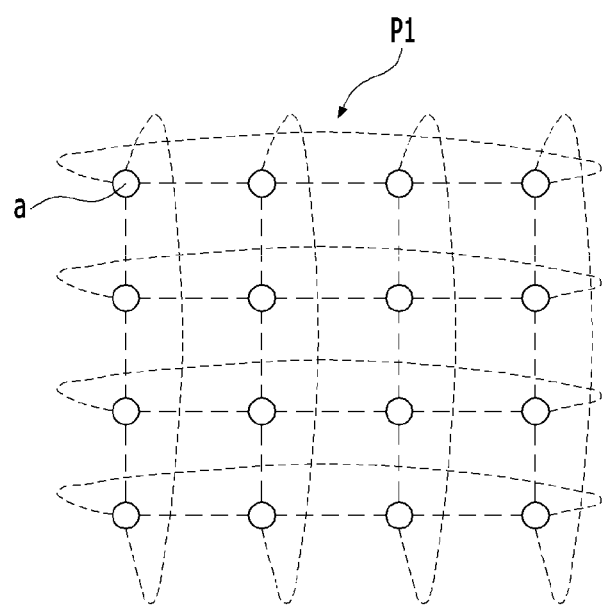

Meanwhile, a torus network applied to an exemplary embodiment of the present invention is as shown in FIG. 3A and FIG. 3B.

FIG. 3A and FIG. 3B shows examples of a torus network according to an exemplary embodiment of the present invention.

FIG. 3A shows a 4×4×4 three-dimensional (3D) torus network. By considering all of the 64 nodes a as a set of planes, it is possible to classify the 3D torus network shown in FIG. 3A as a set of nodes a of a first plane p1, a second plane p2, a third plane p3, and a fourth plane p4. Each of the planes p1, p2, p3, and p4 consists of 16 nodes a in a 4×4 array.

Here, each node a in each edge is connected to a node at the opposite edge, which is omitted for convenience in FIG. 3A.

FIG. 3B separately shows the single plane p1 of FIG. 3A as nodes in a 2D 4×4 array.

In this way, the distributed file system 200 according to an exemplary embodiment of the present invention can be applied to a 3D torus network as well as a 2D torus network.

Referring back to FIG. 2, the center node 210 and the storage nodes 220 in the distributed file system 200 according to an exemplary embodiment of the present invention are determined when a metadata server (not shown) receives a request for allocation of nodes corresponding to the number of data blocks and parity blocks generated by encoding from the client 230. In other words, when a request is received from the client 230 for allocation in the distributed manner of n nodes which make up n encoded blocks for storing k data blocks and m parity blocks, the metadata server can determine the center node 210 and the storage nodes 220 as described below.

Meanwhile, the metadata server may be logically separated and may physically exist in any one of the client 230, the center node 210, and the storage nodes 220.

In other words, the metadata server is a logical function part in charge of the operation and management of the file system. And metadata server may be configured as a single server, or a plurality of server which are distributed processing of the same function. The metadata server according to an exemplary embodiment of the present invention is not limited to the specific node(s), and denotes the entity which performing the logical function in this disclosure.

Each of the center node 210 and the storage nodes 220 which are data servers in an exemplary embodiment of the present invention and the client 230 may include a communications module (not shown), a memory (not shown), and a processor (not shown).

The communications module may include both of a wired communications module and a wireless communications module. The wired communications module may be implemented as a power line communication device, a telephone line communication device, a home cable (multimedia over coax alliance (MoCA)) device, an Ethernet device, an institute of electrical and electronics engineers (IEEE) 1394 device, an integrated cable home network device, and an RS-485 control device. Also, the wireless communications module may be implemented by a technology including wireless local area network (WLAN), Bluetooth, high data rate (HRD) wireless personal area network (WPAN), ultra-wideband (UWB), Zigbee, impulse radio, 60-GHz WPAN, binary-code division multiple access (CDMA), wireless universal serial bus (USB), wireless high definition multimedia interface (HDMI), and so on.

A program for controlling the corresponding server is stored in the memory. Here, the term "memory" is a common designation of a non-volatile storage device which continually maintains stored information even without a power supply as well as a volatile storage device.

For example, the memory may include NAND flash memories, such as a compact flash (CF) card, a secure digital (SD) card, a memory stick, a solid-state drive (SSD), a micro SD card, etc., magnetic computer storage devices, such as a hard disk drive (HDD), etc., optical disc drives, such as a compact disc (CD)-read only memory (ROM), a digital versatile disc (DVD)-ROM, etc., and so on.

A process in which the center node 210 and the storage nodes 220 are determined by the metadata server will be described in detail below with reference to FIGS. 4 and 5.

Figure 4:
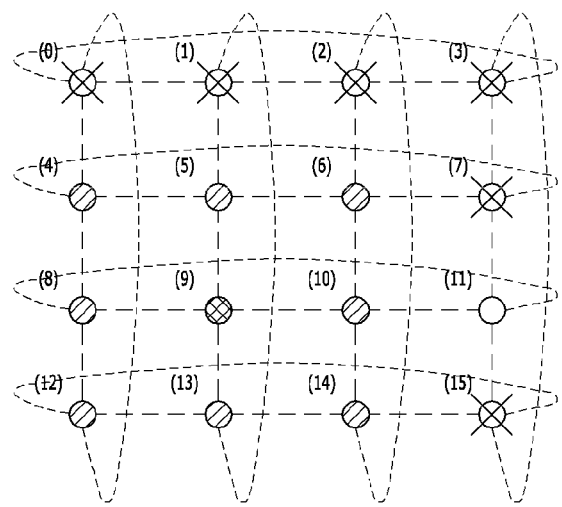
FIG. 4 is a diagram illustrating a process of determining a center node and storage nodes.

FIG. 4 is a diagram illustrating a process of determining the center node 210 and the storage nodes 220. FIG. 5 is a diagram illustrating a process of determining data block storage nodes and parity block storage nodes.

In the distributed file system 200 according to an exemplary embodiment of the present invention, a metadata server first extracts nodes that satisfy a preset first condition of determination from a plurality of nodes included in a torus network and generates a first node set to determine the center node 210. Here, the first condition of determination may be a condition that all of the plurality of nodes included in the torus network are extracted except for nodes having at least one of a disk usage rate, a central processing unit (CPU) usage rate, and a memory usage rate exceeding threshold values.

Referring to FIG. 4, for example, it is assumed that a number n of nodes whose allocation have been requested is a total of nine, that is, six data blocks k and three parity blocks m. Assuming that six nodes including node 0, node 1, node 2, node 3, node 7, and node 15 are excluded under the first condition of determination based on the disk usage rate, etc. in FIG. 4, a first node set is {4, 5, 6, 8, 9, 10, 11, 12, 13, 14}.

When the first node set is generated in this way, the metadata server extracts nodes satisfying a preset second condition of determination from the first node set and generates a second node set. Here, the preset second condition of determination may be a condition that nodes having the largest number of adjacent nodes are extracted from the nodes included in the first node set. However, the second condition of determination is not limited thereto, and a condition based on the sum of bandwidths of nodes, etc. may be added depending on a situation.

For example, in FIG. 4, adjacent nodes of node 4 are two nodes including node 5 and node 8, and adjacent nodes of node 5 are three nodes including node 4, node 6, and node 9. According to such a process, it is possible to calculate all numbers of the adjacent nodes for the first node set.

Adjacent nodes of node 4 and the number thereof: {5, 8}, 2

Adjacent nodes of node 5 and the number thereof: {4, 6, 9}, 3

Adjacent nodes of node 6 and the number thereof: {5, 10}, 2

Adjacent nodes of node 8 and the number thereof: {4, 9, 11, 12}, 4

Adjacent nodes of node 9 and the number thereof: {5, 8, 10, 13}, 4

Adjacent nodes of node 10 and the number thereof: {6, 9, 11, 14}, 4

Adjacent nodes of node 11 and the number thereof: {8, 10}, 2

Adjacent nodes of node 12 and the number thereof: {8, 13}, 2

Adjacent nodes of node 13 and the number thereof: {9, 12, 14}, 3

Adjacent nodes of node 14 and the number thereof: {10, 13}, 2

Among the nodes, nodes having the largest number of adjacent nodes are node 8, node 9, and node 10. Accordingly, the second node set is {8, 9, 10}. The second node generated in this way becomes a set of candidates for the determination of the center node 210.

For reference, the maximum number of adjacent nodes can be four in a two-dimensional (2D) torus network and six in a 3D torus network.

Next, the metadata server extracts nodes from the nodes included in the first node set that satisfy a preset third condition of determination with respect to each node included in the second node set, thereby generating third node sets. Here, the third condition of determination may be a condition that a number of nodes corresponding to a node allocation request be extracted in order of increasing distance from each node included in the second node set. When nodes have the same number of hops, it is possible to select an arbitrary node among them or select a node using information including disk usage rates, etc. on the nodes.

That is to say, in the above example, the metadata server can extract the number of nodes requested to be allocated from the nodes included in the first node set in order of increasing distance from each of node 8, node 9, and node 10 included in the second node set, thereby generating third node sets.

A third node set of node 8={8, 4, 9, 11, 12, 5, 13, 6, 14}

A third node set of node 9={9, 5, 8, 10, 13, 4, 6, 12, 14}

A third node set of node 10={10, 6, 9, 11, 14, 5, 13, 8, 4}

After third node sets are generated in this way, the metadata server adds up the numbers of hops between each node included in the second node set and each node included in a third node set corresponding to the node included in the second node set. Then, a node included in the second node set and corresponding to a third node set resulting in the smallest sum of the numbers of hops is determined as the center node 210. Here, the number of network hops denotes the number of network hops between the center node 210 and another node in the corresponding set.

In the example of FIG. 4, the sum of the numbers of hops of a third node set corresponding to each of node 8, node 9, and node 10 is calculated as follows.

The sum of the numbers of network hops of a third node set corresponding to node 8=0+1+1+1+1+2+2+3+3=14

The sum of the numbers of network hops of a third node set corresponding to node 9=0+1+1+1+1+2+2+2+2=12

The sum of the numbers of network hops of a third node set corresponding to node 10=0+1+1+1+1+2+2+2+3=13

Each third node set includes all nodes whose number of hops is one. At this time, when the number of nodes in a third node set is smaller than the number of nodes requested to be allocated, nodes whose number of hops is two are included. In this way, nodes can be extracted in order of increasing distance until the number of nodes in the third node set becomes the number of nodes requested to be allocated (nine in the above example).

In the above example, since the sum of the numbers of network hops of a third node set corresponding to node 9 among the three third node sets is 12 which is the smallest, node 9 is determined as a center node.

Nodes of third node sets including the center node 210 determined according to the above process are determined as the storage nodes 220.

When the center node 210 and the storage nodes 220 are determined by the metadata server as described above, data encoding is performed by the center node 210, and data blocks and parity blocks are generated. The generated blocks are stored in the center node 210 and the storages nodes 220-1, 220-2, . . . , and 220-1 on a one-to-one basis in the distributed manner.

Here, the data blocks or the parity blocks are each stored in the storage nodes 220. To this end, the storage nodes 220 can be classified by the metadata server into data block storage nodes and parity block storage nodes.

Among the nodes included in the third node sets, nodes located at the shortest distance from the center node 210 may be determined as data block storage nodes. When the determination of data block storage nodes is finished, parity block storage nodes are determined. The nodes included in the third node sets other than the data block storage nodes may be determined as parity block storage nodes.

Figure 5:
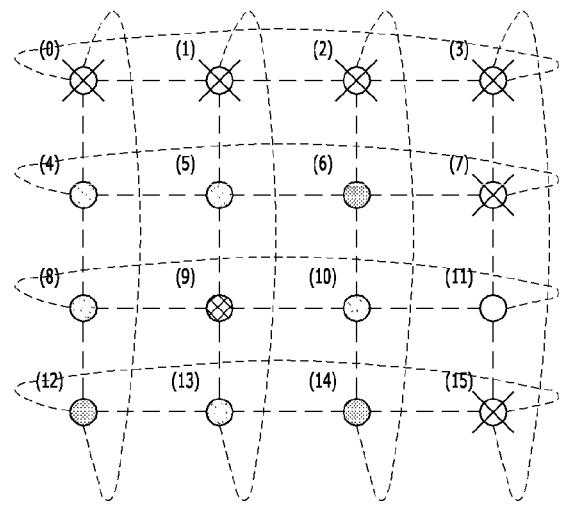
FIG. 5 is a diagram illustrating a process of determining data block storage nodes and parity block storage nodes.

For example, as shown in FIG. 5, node 5, node 8, node 10, and node 13 whose number of network hops from node 9 which has been determined as the center node 210 is one and node 4 whose number of network hops is two may be determined as data block storage nodes, and the other nodes may be determined as parity block storage nodes.

When nodes are allocated and roles of the respective nodes are determined as described above, the client 230 may transmit data to node 9 which is the center node 210. Data blocks generated when node 9 performs encoding are each stored in node 4, node 5, node 8, node 9, node 10, and node 13, and parity blocks are each stored in node 6, node 12, and node 14.

For reference, components shown in FIGS. 2 to 5 according to an exemplary embodiment of the present invention may be implemented in the form of software or hardware such as a field programmable gate array (FPGA) or an application-specific integrated circuit (ASIC) and may perform predetermined roles.

However, the components are not limited to software or hardware, and each component may be configured to be in an addressable storage medium or configured to run one or more processors.

Therefore, examples of components include components such as software components, object-oriented software components, class components, and task components, processes, functions, attributes, procedures, subroutines, segments of program code, drivers, firmware, microcode, circuitry, data, databases, data structures, tables, arrays, and variables.

The components and functionality provided in the components may be combined into fewer components or subdivided into additional components.

A method of supporting data fault tolerance in the distributed file system 200 according to an exemplary embodiment of the present invention will be described below with reference to FIGS. 6 to 8.

Figure 6:
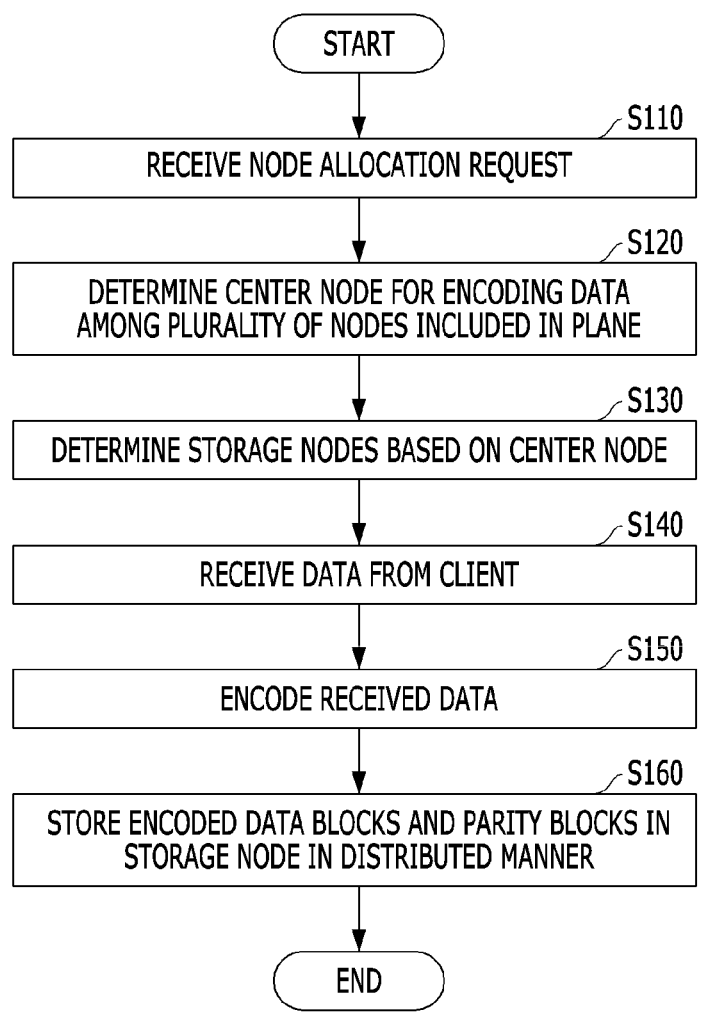
FIG. 6 is a flowchart of a method of supporting data fault tolerance in a distributed file system according to an exemplary embodiment of the present invention.

FIG. 6 is a flowchart of a method of supporting data fault tolerance in the distributed file system 200 according to an exemplary embodiment of the present invention. FIG. 7 is a flowchart of a method of determining the center node 210. FIG. 8 is a flowchart of a method of determining the storage nodes.

Referring to FIG. 6, in the method of supporting data fault tolerance in the distributed file system 200 according to an exemplary embodiment of the present invention, a metadata server (not shown) first receives a request for allocation of nodes corresponding to the number of data blocks and parity blocks generated by encoding from the client 230 (S110).

When the request is received, the metadata server determines the center node 210 among a plurality of nodes included in a torus network (S120) which will encode data.

Figure 7:
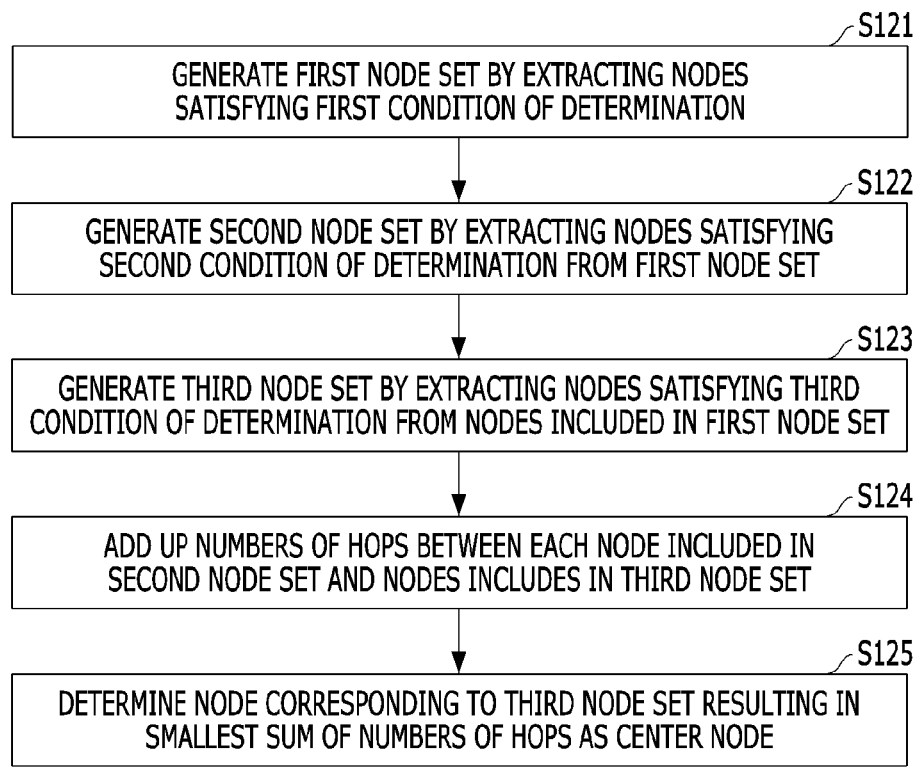
FIG. 7 is a flowchart of a method of determining a center node.

Referring to FIG. 7, in the operation of determining the center node 210, the metadata server first extracts nodes from the plurality of nodes included in the torus network that satisfy a preset first condition for determination, thereby generating a first node set (S121). Here, the first condition of determination may be a condition that nodes having at least one of a disk usage rate, a CPU usage rate, and a memory usage rate exceeding preset threshold values be extracted from the plurality of nodes included in the torus network.

Subsequently, the metadata server extracts nodes from the first node set that satisfy a preset second condition of determination, thereby generating a second node set (S122). Here, the preset second condition of determination may be a condition that nodes having the largest number of adjacent nodes are extracted from the nodes included in the first node set.

When the first and second node sets are generated in this way, with respect to each node included in the second node set, the metadata server extracts nodes from the nodes included in the first node set that satisfy a preset third condition of determination, thereby generating third node sets (S123). Here, the preset third condition of determination may be a condition that the number of nodes corresponding to the node allocation request be extracted in order of increasing distance from each node included in the second node set.

Subsequently, the metadata server adds up the numbers of hops between each node included in the second node set and each node included in a third node set corresponding to the node included in the second node set (S124) and determines a node included in the second node set and corresponding to a third node set resulting in the smallest sum of the numbers of hops as the center node 210 (S125).

Referring back to FIG. 6, the metadata server determines nodes of third node sets including the center node 210 as the storage nodes 220 (S130). Here, the storage nodes 220 can be classified into storage nodes for storing data blocks and storage nodes for storing parity blocks, and the storage nodes for storing data blocks and the storage nodes for storing parity blocks can be determined according to a process shown in FIG. 8.

Figure 8:
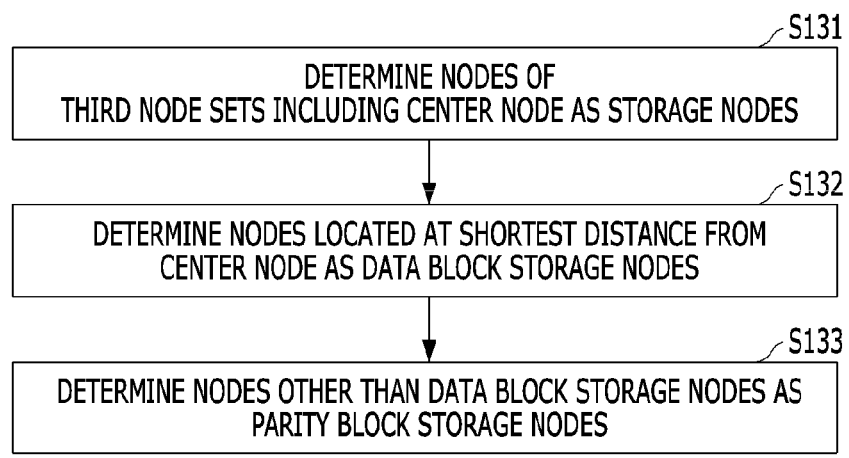
FIG. 8 is a flowchart of a method of determining storage nodes.

Referring to FIG. 8, in the operation of determining the storage nodes 220, the metadata server first determines nodes located at the shortest distance from the center node 210 among the nodes included in the third node sets other than the center node 210 as storage nodes 220 for storing data blocks (S131).

After the storage nodes 220 for storing data blocks are determined, the metadata server determines nodes other than the storage nodes 220 for storing data blocks as storage nodes 220 for storing parity blocks (S132).

Referring back to FIG. 6, when the center node 210 and the storage nodes 220 are determined according to the above processes, the center node 210 receives data from the client 230 (S140) and encodes the received data (S150). Then, the center node 210 stores each of the data blocks and parity blocks generated by the encoding in the storage nodes 220 in the distributed manner (S160).

In the above description, operation S110 to S160 may be subdivided into sub-operations or combined into fewer operations according to embodied examples. Also, some operations may be omitted or performed in different order as necessary. Further, although omitted, descriptions made for the distributed file system 200 in FIGS. 2 to 5 apply to the operating method of FIGS. 6 to 8.

According to an exemplary embodiment of the present invention, it is possible to solve the problem of expandability of a fat-tree interconnection network of related art.

Also, it is possible to effectively support the erasure coding technique in a distributed file system based on a torus interconnection network.

Further, it is possible to improve performance of a distributed file system by reducing input and output times of the distributed file system while maintaining a light torus networking load.

The method of supporting data fault tolerance in the distributed file system 200 according to an exemplary embodiment of the present invention can be implemented in the form of a computer program stored in a medium executed by a computer or a recording medium including computer-executable instructions. Computer-readable media may be any available media that can be accessed by a computer and include all of volatile and non-volatile media and removable and non-removable media. Also, the computer-readable media may include all of computer storage media and communications media. The computer storage media include computer-readable instructions, data structures, program modules, or all of volatile and non-volatile media and removable and non-removable media implemented by arbitrary methods or technology for storing information such as data. The communications media typically embody computer-readable instructions, data structures, program modules, data in a modulated data signal, such as a carrier wave, or other transmission mechanisms and include any information delivery media.

Although the method and system of the present invention have been described with particular embodiments, some or all of components or operations thereof may be implemented by a computer system having a general-purpose hardware architecture.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A distributed file system, the distributed file system comprising:
    a plurality of nodes in a torus network, the plurality of nodes including:
        a center node configured to receive data from a client, and to generate blocks by encoding the data, the blocks including data blocks, parity blocks, or both; and
        one or more storage nodes configured to receive the blocks from the center node and to store the blocks
    a metadata server configured to select a plurality of candidate nodes among the plurality of nodes, to select a node corresponding to a smallest number of hops between the plurality of candidate nodes as the center node, and to select the one or more storage nodes among the plurality of candidate nodes.

2. The distributed file system of claim 1, wherein the metadata server selects the center node and the storage nodes in response to a request for allocation of nodes corresponding to a number of the blocks generated by the center node is received.

3. The distributed file system of claim 2, wherein the metadata server is further configured to generate first to third node sets from the plurality of nodes included in the torus network,
    wherein the center node is a node included in the second node set and corresponding to a third node set resulting in a smallest sum of numbers of hops between each node included in the second node set and each node included in the third node set corresponding to the node included in the second node set.

4. The distributed file system of claim 3, wherein the first node set includes nodes satisfying a preset first condition of determination among the plurality of nodes included in the torus network,
    the second node set includes nodes satisfying a preset second condition of determination in the first node set, and
    the third node sets includes nodes satisfying a preset third condition of determination with respect to each of the nodes included in the second node set among the nodes included in the first node set.

5. The distributed file system of claim 4, wherein the preset first condition of determination is a condition that the plurality of nodes included in the torus network be extracted except for nodes having at least one of a disk usage rate, a central processing unit (CPU) usage rate, and a memory usage rate exceeding preset threshold values.

6. The distributed file system of claim 4, wherein the preset second condition of determination is a condition that nodes having a largest number of adjacent nodes be extracted from the nodes included in the first node set.

7. The distributed file system of claim 4, wherein the preset third condition of determination is a condition that the number of nodes corresponding to a node allocation request be extracted in order of increasing distance from each node included in the second node set.

8. The distributed file system of claim 3, wherein nodes of the third node sets including the determined center node are determined as the storage nodes.

9. The distributed file system of claim 8, wherein the one or more storage nodes include data block storage nodes and parity block storage nodes,
    wherein nodes located at a shortest distance from the center node among the nodes included in the third node sets are determined as the data block storage nodes, and wherein the nodes included in the third node sets other than the data block storage nodes are determined as the parity block storage nodes.

10. The distributed file system of claim 1, wherein the metadata server is one of the plurality of nodes in the torus network.

11. The distributed file system of claim 1, wherein the one or more storage nodes including one or more data block storage nodes and one or more parity block storage nodes, the one or more data block storage nodes storing data blocks received from the center node, the one or more parity block storage nodes storing parity blocks received from the center node,
wherein each of the one or more data nodes corresponds to a number of hops between other nodes among the plurality of nodes that is below a threshold.

12. A method, comprising:
selecting, by a metadata server, a plurality of candidate nodes among a plurality of nodes in a torus network;
selecting, as a center node from among the candidate nodes by the metadata server, a node corresponding to a smallest number of hops between the plurality of candidate nodes;
selecting, by the metadata server, one or more storage nodes among the plurality of candidate nodes;
receiving, by the center node, data from a client;
generating, by the center node, a plurality of blocks by encoding the data, the blocks including data blocks, parity blocks, or both; and
storing the blocks in the one or more storage nodes.

13. The method of claim 12, further comprising:
selecting the one or more storage nodes according to a number of hops to the center node.

14. The method of claim 12, wherein the center node and the one or more storage nodes are selected in response to a request for allocation of nodes corresponding to a number of the blocks generated by the center node is received by the metadata server.

15. The method of claim 12, wherein selecting, by a metadata server, a plurality of candidate nodes among a plurality of nodes in a torus network includes generating first to third node sets from the plurality of nodes included in the torus network, and
wherein selecting, as a center node from among the candidate nodes by the metadata server, a node corresponding to a smallest number of hops between the plurality of candidate nodes includes selecting the center node from the second node set, the center node corresponding to a third node set resulting in a smallest sum of numbers of hops between each node included in the second node set and each node included in the third node set corresponding to the node included in the second node set.

16. The method of claim 15, wherein generating the first to third node sets from the plurality of nodes included in the torus network comprises:
selecting, as the first node set, a set of nodes among the plurality of nodes satisfying a first preset condition of determination;
selecting, as the second node set, a set of nodes among the first node set satisfying a preset second condition of determination; and
selecting, as each of the third node sets, a set of nodes among the first node set satisfying a preset third condition of determination with respect to a corresponding node in the second node set.

17. A distributed file system based on a torus network, the distributed file system comprising:
a center node configured to encode data when the data is received from a client; and
one or more storage nodes configured to receive data blocks or parity blocks generated by the encoding from the center node and store the data blocks or parity blocks,
wherein the center node and the storage nodes are determined in response to a request for allocation of nodes corresponding to a number of the data blocks and the parity blocks generated by the encoding is received, and
wherein, when first to third node sets are generated from a plurality of nodes included in the torus network, a node included in the second node set and corresponding to a third node set resulting in a smallest sum of numbers of hops between each node included in the second node set and each node included in the third node set corresponding to the node included in the second node set is determined as the center node.

18. The distributed file system of claim 17, wherein the first node set includes nodes satisfying a preset first condition of determination among the plurality of nodes included in the torus network,
the second node set includes nodes satisfying a preset second condition of determination in the first node set, and
the third node sets include nodes satisfying a preset third condition of determination with respect to each of the nodes included in the second node set among the nodes included in the first node set.

19. The distributed file system of claim 18, wherein the preset first condition of determination is a condition that the plurality of nodes included in the torus network be extracted except for nodes having at least one of a disk usage rate, a central processing unit (CPU) usage rate, and a memory usage rate exceeding preset threshold values
wherein the preset second condition of determination is a condition that nodes having a largest number of adjacent nodes be extracted from the nodes included in the first node set, and
wherein the preset third condition of determination is a condition that the number of nodes corresponding to the node allocation request be extracted in order of increasing distance from each node included in the second node set.

20. The distributed file system of claim 17, wherein the storage nodes include data block storage nodes and parity block storage nodes,
wherein nodes located at a shortest distance from the center node among the nodes included in the third node sets are determined as the data block storage nodes, and
wherein the nodes included in the third node sets other than the data block storage nodes are determined as the parity block storage nodes.

* * * * *